(12) United States Patent
Kondoh et al.

(10) Patent No.: US 7,705,079 B2
(45) Date of Patent: Apr. 27, 2010

(54) POLYARYLENE SULFIDE RESIN COMPOSITION

(75) Inventors: Hidemi Kondoh, Fuji (JP); Yoshihito Fukasawa, Fuji (JP); Hiroyuki Monde, Tokushima (JP)

(73) Assignees: Polyplastics Co., Ltd., Tokyo (JP); Otsuka Chemical Co., Ltd., Osaka (JP)

( * ) Notice: Subject to any disclaimer, the term of this patent is extended or adjusted under 35 U.S.C. 154(b) by 30 days.

(21) Appl. No.: 12/085,912

(22) PCT Filed: Dec. 13, 2006

(86) PCT No.: PCT/JP2006/325309

§ 371 (c)(1),
(2), (4) Date: Jun. 12, 2008

(87) PCT Pub. No.: WO2007/069770

PCT Pub. Date: Jun. 21, 2007

(65) Prior Publication Data
US 2009/0253843 A1 Oct. 8, 2009

(30) Foreign Application Priority Data
Dec. 16, 2005 (JP) .............................. 2005-362684

(51) Int. Cl.
*C08K 3/22* (2006.01)
(52) U.S. Cl. ...................... 524/413; 524/404; 524/428; 524/432; 524/433; 524/436; 524/435; 524/437; 524/456
(58) Field of Classification Search ................ 524/404, 524/413, 432, 433, 436, 437, 456, 428
See application file for complete search history.

(56) References Cited

U.S. PATENT DOCUMENTS 4,482,665 A * 11/1984 Dix ............................ 524/262

2002/0187267 A1 * 12/2002 Tamura et al. .............. 427/304
2003/0139510 A1 * 7/2003 Sagal et al. ................. 524/404
2007/0254984 A1 * 11/2007 Sugawara et al. ........... 523/300

FOREIGN PATENT DOCUMENTS

| JP | 03-281574 A | 12/1991 |
|----|-------------|---------|
| JP | 08-041247 A | 2/1996 |
| JP | 08-333513 A | 12/1996 |
| JP | 2003-096298 A | 4/2003 |
| JP | 2003-138067 A | 5/2003 |
| JP | 2003-277562 A | 10/2003 |
| JP | 2004-035858 A | 2/2004 |
| JP | 2004-277520 A | 10/2004 |
| JP | 2004-335364 A | 11/2004 |
| JP | 2005-93096 A | 4/2005 |
| JP | 2005-94068 A | 4/2005 |
| WO | WO 97/20324 | 6/1997 |
| WO | WO 97/42639 | 11/1997 |

OTHER PUBLICATIONS

Supplementary European Search Report for Application No. 06834979.4 dated Aug. 17, 2009.

* cited by examiner

*Primary Examiner*—Peter Szekely
(74) *Attorney, Agent, or Firm*—Buchanan Ingersoll & Rooney PC

(57) ABSTRACT

The present invention provides a polyarylene sulfide resin composition which shows high dielectric constant and low dielectric dissipation factor, has excellent moldability, and has improved corrosive property to metal parts. More specifically, to 100 parts by weight of (A) polyarylene sulfide resin, compounded are 10 to 400 parts by weight of (B) an alkaline earth metal titanate showing 50 or higher relative dielectric constant and 0.05 or lower dielectric dissipation factor at 1 MHz, and containing less than 500 ppm of metal ion which is extracted by hot water; and 0.01 to 15 parts by weight of (C) one or more compound selected from hydroxides and oxides of alkaline earth metals.

15 Claims, No Drawings

POLYARYLENE SULFIDE RESIN COMPOSITION

TECHNICAL FIELD

The present invention relates to a polyarylene sulfide resin composition which shows high dielectric constant and low dielectric dissipation factor, has an excellent moldability, and has an improved corrosive property to metal parts.

BACKGROUND ART

Since polyarylene sulfide (hereinafter, it may be abbreviated as PAS) resin represented by polyphenylene sulfide (hereinafter, it may be abbreviated as PPS) resin has high heat-resistant properties, mechanical physical properties, chemical-resistant properties, dimensional stability and flame-resistant properties, it is widely used for part materials of electric and electronic devices. Meanwhile, recently, technologies have accomplished significant development in information and communication fields such as cellular phone or wireless LAN, or ITS technologies such as GPS, VICS or ETC. In accordance with this, there increases needs for electronic parts for high frequency waves with high performance that can be applied in high frequency wave regions such as microwave and extremely-high frequency wave. Materials constituting these electronic parts are required to have appropriate dielectric properties answering to respective designs.

Thermoplastic resins including the PAS resin are widely used for injection molding applications, and, since they have high moldability to make it easy to form parts having a relatively complex shape, they have such superiority that the degree of freedom in design becomes dramatically high, which has been restricted in the case of metal, thermo-setting resin and ceramic having conventionally been used as a material of electronic parts for high frequency wave. In addition, it is possible to say that they have advantages also from an environmental standpoint such as recycle properties.

On the basis of such background, there are proposed various kinds of high dielectric constant resin compositions of specific properties including PAS resin as a matrix (JP-A 3-281574, JP-A 8-41247, JP-A 2005-93096 and JP-A 2005-94068). According to these techniques, although a PAS resin composition having high relative dielectric constant can be obtained, the resin composition described in JP-A 3-281574 has a relatively high dielectric dissipation factor, and resin compositions described in JP-A 8-41247, JP-A 2005-93096 or JP-A 2005-94068 have high melt viscosity, therefore, it can not necessarily be said that they are suitable for injection molding application. In addition, no measures are taken to the generation of corrosive gas caused by the decomposition of the PAS resin when the resin composition is molten and kneaded.

DISCLOSURE OF THE INVENTION

A purpose of the present invention is to solve the above-described problem of conventional techniques and to provide a PAS resin composition which shows high dielectric constant and low dielectric dissipation factor, has excellent moldability, and has improved corrosive property to metal parts.

As the result of hard studies for accomplishing the purpose, the present inventors found that, by compounding a hydroxide or oxide of a specified alkaline earth metal titanate and a hydroxide or oxide of an alkaline earth metal with PAS resin. The PAS resin shows a high dielectric constant and a low dielectric dissipation factor, has an excellent moldability, and also has an improved corrosive property to metal parts, to accomplish the present invention.

That is, the present invention relates to a polyarylene sulfide resin composition, obtained by compounding:

100 parts by weight of (A) a polyarylene sulfide resin;

10 to 400 parts by weight of (B) an alkaline earth metal titanate showing 50 or higher relative dielectric constant and 0.05 or lower dielectric dissipation factor at 1 MHz, and containing less than 500 ppm of metal ion which is extracted by hot water; and 0.01 to 15 parts by weight of (C) one or more of hydroxide and oxide of alkaline earth metal.

DETAILED DESCRIPTION OF THE INVENTION

Hereinafter, the present invention will be described in detail. The PAS resin used as the (A) component in the present invention is mainly composed of —(Ar—S)— (wherein Ar is an arylene group) as a repeating unit. Examples of usable arylene groups include a p-phenylene group, a m-phenylene group, an o-phenylene group, a substituted phenylene group, a p,p'-diphenylenesulfone group, a p,p'-biphenylene group, a p,p'-diphenyleneether group, a p,p'-diphenylenecarbonyl group and a naphthalene group. In this case, there is also such a case that copolymer including different kinds of repeating units among arylene sulfide groups constituted of above-described arylene groups is preferable from the standpoint of processability of the composition, in addition to polymers including the same repeating unit, that is, homopolymer.

For the homopolymer, one including a p-phenylene sulfide group, which uses a p-phenylene group as the arylene group, is used particularly preferably. For the copolymer, the combination of different two or more kinds of arylene sulfide groups, which are composed of above-described arylene groups, can be employed, but, among these, a combination including a p-phenylene sulfide group and m-phenylene sulfide group is particularly preferably used. Further, one including 70% by mol or more of a p-phenylene sulfide group, preferably 80% by mol or more is suitable from the standpoint of physical properties such as heat-resistant properties, flowability (moldability) and mechanical properties.

Among these PAS resins, a high-molecular-weight polymer substantially having a linear structure, which is obtained by condensation polymerization from monomer including a bifunctional halogenated aromatic compound as the main body, is used particularly preferably. And, in addition to the PAS resin having a linear structure, a polymer, in which a branched structure or crosslinked structure is partially formed by using a little amount of monomer such as a polyhalo aromatic compound having three or more halogen substituents when performing condensation polymerization, can be employed, a polymer having improved moldability and processability by oxidatively or thermally crosslinking a polymer having a linear structure with relatively low molecular weight by heating at high temperatures in the presence of oxygen or an oxidizing agent, or a mixture thereof may also be employed.

Further, the PAS resin as the (A) component may be a mixed system wherein the main body is the above-described linear PAS resin (having viscosity of 10 to 300 Pa·s at 310° C. and shear rate of 1200 $sec^{-1}$) and a part (1 to 30% by weight, preferably 2 to 25% by weight) thereof is a branched or crosslinked PAS resin having relatively high viscosity (300 to 3000 Pa·s, preferably 500 to 2000 Pa·s). Furthermore, preferably the PAS resin for use in the present invention has been subjected to acid washing, hot water washing, or organic solvent washing (or the combination thereof) after the polymerization to remove and purify by-produced impurities and the like.

Next, the alkaline earth metal titanate used as the (B) component in the present invention is one that shows 50 or higher relative dielectric constant and 0.05 or lower dielectric dissipation factor at 1 MHz, and that contains less than 500 ppm of metal ion which is extracted by hot water. By using a metal titanate showing such high dielectric constant as 50 or higher relative dielectric constant at 1 MHz, a molded product showing high dielectric constant can effectively be obtained. The use of titanate showing lower than 50 relative dielectric constant can not largely enhance dielectric constant to lack in practicality. In addition, dielectric dissipation factor at 1 MHz must be 0.05 or lower. When it exceeds 0.05, dielectric loss becomes great to lead to performance deterioration as an electronic part.

As the alkaline earth metal titanate showing 50 or higher relative dielectric constant and 0.05 or lower dielectric dissipation factor at 1 MHz, calcium titanate, barium titanate and the like are mentioned.

In addition, the alkaline earth metal titanate for use in the present invention must be an alkaline earth metal titanate containing less than 500 ppm of metal ion which is extracted by hot water, preferably less than 100 ppm. Such an alkaline earth metal titanate can be obtained by treating alkaline earth metal titanate synthesized by a conventionally known method such as a flux method with hot water or an inorganic acid such as hydrochloric acid, sulfuric acid, nitric acid and phosphoric acid. When one containing a metal ion amount exceeding 500 ppm which is extracted by hot water is used, the melt viscosity of the resin composition is high to deteriorate moldability.

The alkaline earth metal titanate as the (B) component has such shape as fibrous, plate-like and particulate, and, by selecting the shape of an alkaline earth metal titanate in accordance with the intended use of the present composition, it becomes possible to look to further property enhancement.

From the standpoint of further enhancing mechanical strength and thermal properties, the use of a fibrous alkaline earth metal titanate is beneficial. The fibrous alkaline earth metal titanate for use in the present invention has fiber diameter of 3 μm or less, fiber length of 5 μm or more, and the aspect ratio of 3 or more, preferably 10 or more.

From the standpoint of reducing a mold shrinkage and coefficient of linear thermal expansion, or reducing anisotropy, or enhancing molding processability, the use of a plate-like or particulate alkaline earth metal titanate is beneficial. In the present invention, "plate-like" includes flake-like, scale-like, mica-like shapes, and the like. A plate-like alkaline earth metal titanate for use in the present invention usually has an average major axis of around 0.5 to 100 μm, preferably around 1 to 20 μm, an average minor axis of around 0.2 to 100 μm, preferably 0.5 to 20 μm, and an average thickness of around 0.01 to 10 μm, preferably around 0.05 to 5 μm, according to the observation with a scanning electron microscope. The ratio of the average particle diameter measured with a laser diffraction type particle size distribution meter and the average thickness measured with a scanning electron microscope (average particle diameter/average thickness) is around 3 to 100, preferably around 5 to 50. As the particulate alkaline earth metal titanate, one having a size of 10 μm or more as the median diameter, preferably 20 μm or more, further preferably 20 to 500 μm or more. The median diameter can be measured with a laser diffraction type particle size distribution meter. The median diameter is a cumulative diameter at 50% by volume.

The compounding amount of the (B) alkaline earth metal titanate is 10 to 400 parts by weight relative to 100 parts by weight of the PAS resin. When the compounding amount is less than 10 parts by weight, the effect of enhancing the dielectric constant is small, and, when it exceeds 400 parts by weight, the processability deteriorates.

In the present invention, by further compounding one or more compounds selected from hydroxides and oxides of alkaline earth metals as the (C) component, a PAS resin composition having further improved corrosive property to metal parts, while maintaining high dielectric constant, low dielectric dissipation factor and excellent moldability, can be obtained. As the metal for such compounds, calcium, strontium, barium and magnesium are mentioned, wherein calcium is preferable.

The compounding amount of one or more compounds selected from the (C) hydroxide and oxide of alkaline earth metal is 0.01 to 15 parts by weight relative to 100 parts by weight of the PAS resin. When the compounding amount is less than 0.01 part by weight, the effect of improving corrosive property to metal parts is small, and, when it exceeds 15 parts by weight, the melt viscosity of the resin composition increases to deteriorate moldability.

In the present invention, in order to reduce the temperature change dependency of the relative dielectric constant of the composition, further compounding (D) a temperature dependency-controlling material for relative dielectric constant as described below is preferable as the (D) component.

Examples of the component for (D) a temperature dependency-controlling material for relative dielectric constant include $Al_2O_3$, BN, BaO, BeO, $Bi_2O_3$, CaO, $CeO_2$, $Cr_2O$, $Fe_2O_3$, $La_2O_3$, $Na_2O$, $Nb_2O_5$, $Nd_2O_3$, $Pr_6O_{11}$, SiC, $Si_2N_4$, $SiO_2$, SrO, $TiO_2$, $Y_2O_3$, ZnO and $ZrO_2$. Usually, a product composed of two or more of these components is used. On this occasion, raw materials such as an oxide, carbonate or hydroxide are mixed, which is sintered and pulverized, or calcined (a method of once burning a material at a temperature slightly lower than actual sintering temperature not to be completely solidified) to be used. Preferably, a mixture composed of at least two components selected from BaO, $Bi_2O_3$, $La_2O_3$, $Nd_2O_3$, $Sm_2O_3$, $Al_2O_3$ and $TiO_2$ is used. More preferably, a mixture composed of at least one selected from BaO, $Bi_2O_3$, $La_2O_3$, $Nd_2O_3$, $Sm_2O_3$ and $Al_2O_3$ and $TiO_2$, wherein preferably the ratio of $TiO_2$ is 10 to 50% by weight of the whole (D) component.

As the (D) component, the above-described compounds are combined and used, or a commercially available compound containing two or more kinds of above-described compounds in an amount of 80% by weight (for example, trade name BTTE, Ba—Nd—Ti—Bi—La-based; manufactured by OTSUKA Chemical Co., Ltd.) can be used.

The particle diameter of the (D) component is preferably 10 μm or less, more preferably 2 μm or less, from the standpoint of dispersibility in resin.

Regarding the content of the (D) component, it is compounded at a ratio of 1 to 400 parts by weight relative to 100 parts by weight of the resin, more preferably at a ratio of 100 to 300 parts by weight. When the content is smaller, the temperature-change characteristics of relative dielectric constant deteriorate, and, when the content is too much, the molding processability deteriorates and the molded article is brittle.

Further, in the present invention, for the purpose of enhancing mechanical strength and thermal properties while maintaining the low dielectric dissipation factor of the composition, preferably an (E) component described below is compounded.

As the (E) component, fibrous materials represented by $aA_xO_y \cdot bB_2O_3$ (wherein a and b each represents real number of 1 to 9, A represents a metal selected from Al, Mg and Ni, x and y represent numbers satisfying such a combination as x=2, y=1, or x=y=1 or x=2, y=3) include an aluminum borate fiber, a magnesium borate fiber and a nickel borate fiber.

There are exemplified as the aluminum borate fiber preferably a compound represented by the formula $9Al_2O_3 \cdot 2B_2O_3$ or the formula $2Al_2O_3 \cdot B_2O_3$, as the magnesium borate fiber more specifically a compound represented by the formula $2MgO \cdot B_2O_3$, and as the nickel borate fiber more specifically a compound represented by the formula $3NiO \cdot B_2O_3$.

Alternatively, fibrous materials represented by a general formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from Ca, Zn, Al and Mg) include wollastonite represented by a formula $CaO \cdot SiO_2$, xonotlite represented by $6CaO \cdot 6SiO_2 \cdot H_2O$, zinc silicate represented by $2ZnO \cdot SiO_2$, mullite represented by $3Al_2O_3 \cdot 2SiO_2$, sepiolite represented by $2MgO \cdot 3SiO_2 \cdot 3.5H_2O$, chrysotile represented by $3MgO \cdot 2SiO_2 \cdot 2H_2O$, and the like.

Among the above, there can be exemplified wollastonite represented by a formula $CaO \cdot SiO_2$, xonotlite represented by $6CaO \cdot 6SiO_2 \cdot H_2O$, and the like as particularly preferable materials.

Regarding the (E) component, the use of a thin and long fibrous material containing a component with an aspect ratio of 6 or more in 60% by weight or more, preferably in 80% by weight or more, and a component with a fiber diameter of 5 μm or less in 80% by weight or more, preferably 95% by weight or more is beneficial from the standpoint of further enhancing mechanical strength and thermal properties.

One kind or two or more kinds of the above-described compounds may be included, and the (E) component is compounded at a ratio of 1 to 150 parts by weight relative to 100 parts by weight of the resin, more preferably at a ratio of 10 to 100 parts by weight. When the content is smaller, mechanical strength and thermal properties deteriorate, and, when the content is too much, the molding processability deteriorates and the molded article is brittle.

To the resin composition of the present invention, for improving such performances as mechanical strength, heat-resistant properties, dimensional stability (deformation resistance, warp-deformation) and electric properties, there can be compounded an inorganic filler other than the (E) component, which is a fibrous material represented by $aA_xO_y \cdot bB_2O_3$ (wherein a and b each represents a real number of 1 to 9, A represents a metal selected from Al, Mg and Ni, and x and y represent numbers satisfying such a combination as x=2, y=1, or x=y=1 or x=2, y=3) or a fibrous material represented by the general formula $pM_vO_w \cdot qSiO_2 \cdot rH_2O$ (wherein p, q and r each represents a real number of $1 \leq p \leq 3$, $1 \leq q \leq 3$, $0 \leq r \leq 10$, v and w represent numbers satisfying such a combination as v=2, w=1, or v=w=1 or v=2, w=3, and M represents a metal selected from Ca, Zn, Al and Mg). As the filler, a fibrous, particulate, or plate-like one is employed according to a purpose.

As the fibrous filler, inorganic fibrous materials are mentioned, including a glass fiber, asbestos fiber, carbon fiber, silica fiber, silica/alumina fiber, zirconia fiber, boron nitride fiber, boron fiber and potassium titanate fiber, and, in addition, fibrous materials of such metals as stainless steel, aluminum, titanium, copper and brass. A particularly representative fibrous filler is a glass fiber, or a carbon fiber. Further, organic fibrous materials with a high melting point such as polyamide, fluorine-containing resin and acrylic resin can also be used. On the other hand, as the particulate filler, there are mentioned carbon black, silica, quartz powder, glass bead, glass powder, silicate such as calcium silicate, aluminum silicate, kaolin, talc, clay, diatomite or wollastonite, oxide of metals such as iron oxide, titanium oxide, zinc oxide or alumina, carbonate of metals such as calcium carbonate and magnesium carbonate, sulfate of metals such as calcium sulfate or barium sulfate, silicon carbide, silicon nitride, boron nitride and various kinds of metal powder. As the plate-like filler, mica, glass flake and various kinds of metal foil. These inorganic fillers can be used in one kind or in a mixture of two or more kinds.

When using these fillers, the use of a sizing agent or surface treatment agent is desirable, if necessary. Examples thereof include functional compounds such as epoxy-based compounds, isocyanate-based compounds, silane-based compounds or titanate-based compounds. These compounds are used while being previously subjected to surface treatment or sizing treatment, or the agent may be simultaneously added when the material is prepared.

The use amount of the inorganic filler is not particularly limited. Generally, it is 10 to 400 parts by weight relative to 100 parts by weight of the PAS resin being the (A) component. When it is too small, mechanical strength deteriorates slightly, and, when it is too large, molding operation becomes difficult and, in addition, trouble also occurs in mechanical strength.

Furthermore, to the resin composition of the present invention, a silane compound may be compounded for the purpose of improving flash and the like in a range that does not deteriorate the effect of the invention. Various kinds of silane compounds are included such as vinylsilane, methacryloxysilane, epoxysilane, aminosilane or mercaptosilane. For example, vinyltrichlorosilane, γ-methacryloxypropyltrimethoxysilane, γ-glycidoxypropyltrimethoxysilane, γ-aminopropyltriethoxysilane, γ-mercaptopropyltrimethoxysilane are exemplified, with no limitation.

To the resin composition of the present invention, another thermoplastic resin may supplementarily be used together in a small amount in accordance with the purpose, in addition to the above-described component. As the other thermoplastic resin, any thermoplastic resin may be adopted when it is stable at high temperatures. Examples thereof include an aromatic polyester composed of an aromatic dicarboxylic acid and a diol or an oxycarboxylic acid, such as polyethylene telephthalate or polybutylene telephthalate, polyamide, polycarbonate, ABS, polyphenylene oxide, polyalkyl acrylate, polysulfone, polyethersulfone, polyetherimide, polyetherketone, fluorine-containing resin and polyallylate. These thermoplastic resins may also be used in combination of two or more kinds.

Furthermore, to the resin composition of the present invention, publicly known materials that are generally added to thermoplastic resin, that is, a stabilizing agent such as an oxidation inhibitor, a flame retardant, a colorant such as dye or pigment, a lubricant, a crystallization accelerator and a crystal-nucleating agent, may suitably be added in accordance with required performance.

The resin composition of the present invention can be prepared by facilities and method that are generally used for preparing a synthetic resin composition. Generally, necessary components are mixed, which are molten and kneaded using a single screw or twin screw extruder and then extruded to form a pellet for molding. It is also one of preferable methods to melt and extrude the resin composition, and, on the way, to add and compound such an inorganic component as a glass fiber thereto.

A raw material pellet thus obtained can be molded using such a generally publicly known method for molding thermoplastic resin as injection molding, extruding molding, vacuum molding or compression molding. The most preferable method is injection molding.

EXAMPLES

Next, the present invention will be described specifically on the basis of Examples and Comparative Examples, but the invention is not limited to these. Specific materials of respective (A), (B), (C), (D) and (E) used in Examples and Comparative Examples are as follows.

(A) Polyphenylene Sulfide (PPS) Resin

FORTRON KPS manufactured by KUREHA CORPORATION (melt viscosity at 310° C. and shear rate 1200 sec$^{-1}$: 22 Pa·s)

(B) Alkaline Earth Metal Titanate (B-1): fibrous calcium titanate, fiber diameter of 0.5 μm, fiber length of 5 μm, relative dielectric constant at 1 MHz of 95, dielectric dissipation factor of 0.001, amount of metal ion extracted by hot water of 80 ppm Preparation method: A titanate fiber was obtained as a raw material by synthesizing a potassium titanate fiber by a flux method and then subjecting the same to dealkali treatment, to which carboxylic acid salt of calcium was deposited. Subsequently, the product was heat-treated to synthesize a calcium titanate fiber, which was then thrown into pure water at 90° C. and stirred for 2 hours. After filtration, the product was dried at 110° C. for 2 hours.

The amount of metal ion contained in calcium titanate, which is to be extracted by hot water, was obtained by dispersing the calcium titanate in pure water at 80° C. in a slurry concentration of 1%, stirring the same for 2 hours, and then quantitatively measuring the amount of metal ion in the filtrate by an atomic absorption spectrometry.

Dielectric constant of filler: Using a Labo Plastomill manufactured by Toyoseiki, polyethylene was compounded and kneaded with a filler while varying the filling factor, and the obtained samples were pulverized. Then a test piece for measuring dielectric property was molded, for which the relative dielectric constant ($\in$r) and dielectric dissipation factor (tan δ) at 1 MHz were measured by a volumetric method according to a Dielectric Test Fixture manufactured by Agilent Technologies using an impedance analyzer. Obtained data were plotted relative to the filling factor of the filler to draw respective graphs, and values when the ratio of the filler was to be 100 vol % were determined to be a relative dielectric constant ($\in$r) and dielectric dissipation factor (tan δ), respectively, of the filler.

(B'-1) (Comparative product): fibrous calcium titanate, fiber diameter of 0.5 μm, fiber length of 5 μm, relative dielectric constant at 1 MHz of 95, dielectric dissipation factor of 0.001, amount of metal ion extracted by hot water of 700 ppm Preparation method: Prepared by the same method as (B-1) except for omitting the hot water processing after synthesizing a calcium titanate fiber.

(B-2): plate-like calcium titanate, average major size of 10 μm, average minor size of 8 μm, average thickness of 0.5 μm, relative dielectric constant at 1 MHz of 90, dielectric dissipation factor of 0.001, amount of metal ion extracted by hot water of 200 ppm Preparation method: A plate-like particle of lithium potassium titanate was synthesized by a sintering method. The obtained plate-like particle and calcium raw material were mixed and heat-treated to synthesize a plate-like particle of calcium titanate, which was thrown into pure water at 90° C. and stirred for 2 hours, then filtered and dried at 110° C. for 2 hours.

The amount of contained metal ion which was extracted by hot water was obtained by the same way as in (B-1).

(B-3): particulate calcium titanate, average particle diameter of 35 μm, relative dielectric constant at 1 MHz of 97, dielectric dissipation factor of 0.001, amount of metal ion extracted by hot water of 200 ppm Preparation method: Scale-like lithium potassium titanate was synthesized by a fusion method. The obtained scale-like product was pulverized to give particulate lithium potassium titanate. The obtained particulate product and calcium raw material were mixed and heat-treated to synthesize particulate calcium titanate, which was thrown into pure water at 90° C. and stirred for 2 hours, then filtered and dried at 110° C. for 2 hours.

The amount of contained metal ion which was extracted by hot water was obtained by the same way as in (B-1).

(B-4): particulate calcium titanate, average particle diameter of 0.5 μm, relative dielectric constant at 1 MHz of 70, dielectric dissipation factor of 0.001, amount of metal ion extracted by hot water of 50 ppm Preparation method: Titanium oxide and calcium raw material were mixed with such a pulverizing and mixing machine as a ball mill and heat-treated to synthesize a calcium titanate particle, which was thrown into pure water at 90° C. and stirred for 2 hours, then filtered and dried at 110° C. for 2 hours.

The amount of contained metal ion which was extracted by hot water was obtained by the same way as in (B-1).

(C) Hydroxide or Oxide of Alkaline Earth Metal

Calcium hydroxide (D) Temperature Dependency-controlling Material of Relative Dielectric Constant (Trade Name: BTTE, Manufactured by OTSUKA Chemical Co., LTD.)

average particle diameter of 2 μm, relative dielectric constant at 1 MHz of 105, dielectric dissipation factor of 0.002

Preparation method: Raw materials of constituents were mixed with such a pulverizing and mixing machine as a ball mill. Uniformly mixed raw materials were heat-treated to give a sintered body. The obtained sintered body was pulverized by a pulverizer to adjust the particle size to an intended value.

(E) Fibrous Material

Wollastonite (trade name: Bistal K 101, average fiber diameter of 20 μm, average fiber length of 2.0 μm, relative dielectric constant at 1 MHz of 6, dielectric dissipation factor of 0.001; manufactured by OTSUKA Chemical Co., LTD.)

Examples 1-8

Comparative Examples 1-6

The (A) component, (B) component, (C) component, (D) component and (E) component were mixed at a ratio as shown in Table 1 with a Henschel mixer for 5 minutes, which was thrown into a twin screw extruder having a cylinder temperature of 320° C., and molten and kneaded at a resin temperature of 350° C. to form a pellet of a resin composition. The obtained pellet was subjected to various evaluations by methods as described bellow. Results are shown in Tables 1 and 2.

(Dielectric Properties)

A test piece for measuring dielectric properties was molded with an injection molding machine at a cylinder temperature of 320° C. and a mold temperature of 150° C., which was left as it was under a predetermined temperature atmosphere for 2 hours or longer, and, subsequently, the relative dielectric constant ($\epsilon r$) and dielectric dissipation factor (tan $\delta$) at 1 MHz were measured by a volumetric method according to a Dielectric Test Fixture manufactured by Agilent Technologies using an impedance analyzer.

(Temperature Dependency of Relative Dielectric Constant)

To the test piece used for measuring dielectric properties, electrodes were formed by vacuum deposition, which was used to measure the temperature dependency of the relative dielectric constant in a temperature-controlled bath when temperature was varied from 25° C. to 125° C., using solid electrodes manufactured by Ando Electric Co., Ltd.

(Melt Viscosity)

Using a capillograph manufactured by Toyoseiki provided with a capillary of 1 mm$\phi$×20 mm L/flat die, melt viscosity at a barrel temperature of 310° C. and a shear rate of 1000 sec$^{-1}$ was measured.

(Tensile Strength)

It was measured according to ISO-527-1, using an autograph manufactured by Shimadzu.

(Coefficient of Linear Thermal Expansion)

It was measured over a measurement temperature range of 0 to 50° C. according to JIS K7197, using a thermomechanical analyzer manufactured by Seiko Instruments.

(Metal-corrosive Property)

4 g of resin pellet were put in the bottom portion of a test tube, a metal test piece (SKD-11) was hung from the uppermost portion of the pellet, and the upper portion of the test tube was plugged to be kept at 350° C. for 3 hours. Then, the metal test piece was left as it was in a humidity-controlled box (23° C., 95% RH) for 24 hours. The resulting test piece was visually subjected to three-stage evaluation (good=A>B>C=bad).

TABLE 1

|  |  | Example 1 | Example 2 | Example 3 | Example 4 | Example 5 | Example 6 | Example 7 | Example 8 |
|---|---|---|---|---|---|---|---|---|---|
| (A) PPS | part by weight | 100 | 100 | 100 | 100 | 100 | 100 | 100 | 100 |
| (B) Alkali earth metal titanate | Kind | B-1 | B-1 | B-1 | B-2 | B-3 | B-4 | B-1 | B-1 |
|  | part by weight | 50 | 300 | 300 | 300 | 300 | 300 | 60 | 100 |
| (C) Calcium hydroxide | part by weight | 0.5 | 0.5 | 10 | 0.5 | 0.5 | 0.5 | 0.5 | 0.5 |
| (D) Temperature dependency-controlling material of the relative dielectric constant | part by weight | — | — | — | — | — | — | 240 | — |
| (E) Fibrous material | part by weight | — | — | — | — | — | — | — | 50 |
| Relative dielectric constant (1 MHz) | — | 6 | 20 | 20 | 19 | 22 | 16 | 17 | 9 |
| Dielectric dissipation factor (1 MHz) | — | 0.002 | 0.002 | 0.002 | 0.002 | 0.002 | 0.002 | 0.003 | 0.002 |
| Temperature dependency of relative dielectric constant | ppm/° C. | 160 | 360 | 370 | 370 | 370 | 350 | 60 | 200 |
| Melt viscosity | Pa·s | 230 | 330 | 370 | 370 | 300 | 420 | 400 | 280 |
| Tensile strength | Mpa | 70 | 80 | 80 | 50 | 60 | 50 | 60 | 110 |
| Coefficient of linear thermal expansion (flow direction) | ×10$^{-5}$/° C. | 3 | 2 | 2 | 2 | 2 | 3 | 3 | 2 |
| Coefficient of linear thermal expansion (transverse direction) | ×10$^{-5}$/° C. | 4 | 3 | 3 | 2 | 2 | 3 | 3 | 3 |
| Metal-corrosive property | — | A | A | A | A | A | A | A | A |

TABLE 2

|  |  | Comparative example 1 | Comparative example 2 | Comparative example 3 | Comparative example 4 | Comparative example 5 | Comparative example 6 |
|---|---|---|---|---|---|---|---|
| (A) PPS | part by weight | 100 | 100 | 100 | 100 | 100 | 100 |
| (B) Alkali earth metal titanate | Kind | B'-1 | B-1 | B-1 | B-1 | B-1 | B-1 |
|  | part by weight | 300 | 5 | 500 | 300 | 300 | 100 |
| (C) Calcium hydroxide | part by weight | — | 0.5 | — | 20 | — | — |
| (D) Temperature dependency-controlling material of the relative dielectric constant | part by weight | — | — | — | — | — | — |

TABLE 2-continued

|  |  | Comparative example 1 | Comparative example 2 | Comparative example 3 | Comparative example 4 | Comparative example 5 | Comparative example 6 |
|---|---|---|---|---|---|---|---|
| (E) Fibrous material | part by weight | — | — | — | — | — | 50 |
| Relative dielectric constant (1 MHz) | — | 20 | 3 | Unkneadable | 20 | 20 | 9 |
| Dielectric dissipation factor (1 MHz) |  | 0.003 | 0.002 | ↑ | 0.002 | 0.002 | 0.002 |
| Temperature dependency of relative dielectric constant | ppm/° C. | 370 | 80 | ↑ | 340 | 370 | 200 |
| Melt viscosity | Pa · s | 500 | 80 | ↑ | 420 | 320 | 250 |
| Tensile strength | Mpa | 70 | 40 | ↑ | 80 | 80 | 110 |
| Coefficient of linear thermal expansion (flow direction) | ×10$^{-5}$/° C. | 2 | 4 | ↑ | 2 | 2 | 2 |
| Coefficient of linear thermal expansion (transverse direction) | ×10$^{-5}$/° C. | 3 | 6 | ↑ | 3 | 3 | 3 |
| Metal-corrosive property | — | B | A | ↑ | A | C | C |

The invention claimed is:

1. A polyarylene sulfide resin composition possessing excellent moldability and an improved corrosive property to metal, comprising:

100 parts by weight of (A) a polyarylene sulfide resin;

10 to 400 parts by weight of (B) an alkaline earth metal titanate showing 50 or higher relative dielectric constant and 0.05 or lower dielectric dissipation factor at 1 MHz, and containing less than 500 ppm of metal ions which is extracted by hot water; and 0.01 to 15 parts by weight of (C) one or more compound selected from the group consisting of hydroxides of alkaline earth metals.

2. The resin composition according to claim 1, wherein the alkaline earth metal titanate of (B) component has a fibrous shape.

3. The resin composition according to claim 1, wherein the alkaline earth metal titanate of (B) component has a plate-like shape.

4. The resin composition according to claim 1, wherein the alkaline earth metal titanate of (B) component has a particulate shape.

5. The resin composition according to claim 1, further comprising 1 to 400 parts by weight of a temperature dependency-controlling material of the relative dielectric constant as (D) component.

6. The resin composition according to claim 1, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

7. The resin composition according to claim 2, further comprising 1 to 400 parts by weight of a temperature dependency-controlling material of the relative dielectric constant as (D) component.

8. The resin composition according to claim 3, further comprising 1 to 400 parts by weight of a temperature dependency-controlling material of the relative dielectric constant as (D) component.

9. The resin composition according to claim 4, further comprising 1 to 400 parts by weight of a temperature dependency-controlling material of the relative dielectric constant as (D) component.

10. The resin composition according to claim 2, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

11. The resin composition according to claim 3, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

12. The resin composition according to claim 4, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

13. The resin composition according to claim 5, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

14. The resin composition according to claim 7, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

15. The resin composition according to claim 8, further comprising, as (E) component, 1 to 150 parts by weight of a fibrous material represented by $aA_xO_y \cdot bB_2O_3$ (wherein a and b each represents real number of 1 to 9, A represents a metal selected from the group consisting of Al, Mg and Ni, x and y represent numbers satisfying such a combination as x=2, y=1, or x=y=1 or x=2, y=3), or a fibrous material represented by formula $pM_vO_w \cdot qSiO_2 \cdot rH_2O$ (wherein p, q and r each represents such a real number as $1 \leq p \leq 3$, $1 \leq q \leq 3$ and $0 \leq r \leq 10$, v and w represents numbers satisfying such a combination as v=2, w=1, or v=w=1 or v=2, w=3, and M represents a metal selected from the group consisting of Ca, Zn, Al and Mg).

* * * * *